United States Patent [19]

Jones et al.

[11] Patent Number: 4,554,091

[45] Date of Patent: Nov. 19, 1985

[54] COLORED BLEACHING COMPOSITIONS

[75] Inventors: Robert A. Jones, Meols, England; Frank Jones, Dielheim, Fed. Rep. of Germany; Graham Taylor, Eastham, England

[73] Assignee: Lever Brothers Company, New York, N.Y.

[21] Appl. No.: 617,202

[22] Filed: Jun. 4, 1984

[30] Foreign Application Priority Data

Jun. 9, 1983 [GB] United Kingdom ................ 8315838

[51] Int. Cl.[4] ...................... C09B 69/10; C11D 3/395

[52] U.S. Cl. .......................... 252/187.25; 252/186.43; 252/187.24; 252/187.26; 524/401; 524/813; 524/812

[58] Field of Search ...................... 252/187.24, 187.25, 252/187.26, 186.43; 524/401

[56] References Cited

U.S. PATENT DOCUMENTS

| | | | |
|---|---|---|---|
| 3,393,153 | 7/1968 | Zimmerer | 252/187.26 |
| 3,655,566 | 4/1972 | Robinson et al. | 252/187.25 |
| 3,663,442 | 5/1972 | Briggs | 252/187.24 |
| 3,671,440 | 6/1972 | Sabatelli | 252/187.25 |
| 3,684,722 | 8/1972 | Nynam | 252/187.25 |
| 3,689,421 | 9/1972 | Briggs | 252/187.25 |
| 3,700,599 | 10/1972 | Mizund | 252/187.25 |
| 4,104,424 | 8/1978 | Steinbrecher | 524/401 |
| 4,503,099 | 3/1985 | Chang | 524/401 |

FOREIGN PATENT DOCUMENTS

| | | |
|---|---|---|
| 2100307 | 12/1982 | United Kingdom . |

*Primary Examiner*—C. Warren Ivy
*Attorney, Agent, or Firm*—Milton L. Honig; James J. Farrell

[57] ABSTRACT

Aqueous bleaching compositions can be satisfactorily colored by inclusion therein of a colored polymer latex which consists of a copolymer of a hydrophobic monomer with a reactive copolymerizable monomer containing a chromophore. These colored polymer latices are particularly suitable for coloring hypochlorite-containing bleaching compositions.

7 Claims, No Drawings

COLORED BLEACHING COMPOSITIONS

The present invention relates to aqueous, coloured, bleaching compositions, particularly alkali metal hypochlorite compositions.

By bleaching compositions are meant aqueous composition comprising an oxygen or chlorine bleaching agent, such as hydrogen peroxide, organic or inorganic persalts (with or without a bleach precursor), organic or inorganic peracids, and alkali metal hypochlorites.

Hereinafter the invention will be described with particular reference to alkali metal hypochlorite compositions, these being the preferred compositions, but it is to be understood that the present invention is also applicable to the above other bleaching compositions.

Aqueous solutions of alkali metal hypochlorites have been known and used since ages unknown. Normally, they consist of an alkali metal hypochlorite, dissolved in water, and are used for general bleaching and disinfecting purposes. Such solutions are normally straw-coloured, and in order to make them more attractive and more distinguishable from other household products, attempts have been made to impart to them a more distinguishable, aesthetically attractive colour.

These hypochlorite solutions however form a strongly oxidizing environment, and consequently the choice of a colouring additive is very limited, restricted to only such colouring additives that are stable in these strongly oxidizing media. Potassium permanganate and potassium dichromate are such colouring agents, but they impart aesthetically less attractive colours (purple and yellow). Ultramarine Blue has also been proposed, but this pigment tends to settle out from the compositions during storage.

During the last decade thickened aqueous hypochlorite solutions have become known and marketed. These are aqueous solutions of an alkali metal hypochlorite which have been thickened by the inclusion therein of a mixture of two different detergent surfactants. The above problems accompanying colouring aqueous hypochlorite solutions also occur on colouring such thickened compositions, but the problem of storage stability arises even with such thickened compositions. Unless major changes are made in the thickening system, the pigment particles tend to settle out, and if major changes are made, this settling out can be reduced, but the thickening effect is significantly impaired.

It has also been proposed to use a floc system in such thickened hypochlorite compositions to prevent the particulate colouring agent from settling out, such a floc system comprising, inter alia, a polymer latex. Although such a polymer latex may provide for an improved physical stability of the particulate colouring agent in the hypochlorite compositions, it does not provide for coloured products which are chemically stable over longer periods.

It has now been found that the chemical and physical stability of colouring agents in aqueous alkali metal hypochlorite compositions can be improved by including therein a polymer latex containing a colouring agent which has been prepared from a water-insoluble monomer.

It has already been proposed in U.S. Pat. No. 3,689,421 (Briggs) to include a polymer latex prepared from a sytrene monomer, in liquid hypochlorite compositions. These latices do not contain a colouring agent; they are used as such as opacifiers in these compositions. These polymer latices are in fact copolymers of styrene and a vinyl acid monomer; polystyrene is, according to this prior proposal, not sufficiently storage-stable in the hypochlorite compositions. In U.S. Pat. No. 3,655,566, Briggs proposed to include optical brighteners in liquid hypochlorite compositions, whereby these optical brighteners are protectively enclosed in the inner portion of a two-layer synthetic polymer particle. This is achieved by dissolving the optical brightener in the oil-soluble monomer and copolymerizing the monomer-brightener solution with a vinyl acid, and subsequently performing a second polymerisation with the hydrophobic monomer, whereby an impermeable film is formed around the previously obtained polymer-brightener particles. Although primarily directed to optical brightening agents, this prior proposal also mentions the possibility to use dyes and pigments such as Ultramarine Blue, Monastral Fast Green GWD, etc.

These polymer particles however contain a hydrophilic monomer as well, and in thickened liquid hypochlorite compositions they do not give a satisfactorily stable colour.

Recently, it has been described in GB-A1-2 100 307 to include a hypochlorite solution stable suspendable dye particle in a liquid bleaching and dyeing composition. These particles contain a dye which is resistant to attack by hypochlorous acid, which dye is incorporated in a hydrophobic latex. The dye is incorporated or "embedded" in a highly hydrophobic matrix, thus shielding it from actual contact with the hypochlorite.

We have now found that coloured hydrophobic latices can be obtained with an improved stability against attack by hypochlorite, if a colourless hydrophobic monomer is co-polymerised with a dye which contains a reactive copolymerisable group.

In contrast to the dye-containing latices of the above prior art, wherein the dye is "trapped", i.e held in the matrix particle by weak physical forces, the latices of the present invention contain a chromophore which is chemically linked to the polymer backbone. Latices containing chromophores linked in this way show better stability, particularly in detergent-containing hypochlorite compositions.

In its broadest aspect therefore, the present invention relates to coloured aqueous alkali metal hypochlorite compositions, comprising as colouring agent a coloured polymer latex which consists of a copolymer of a hydrophobic monomer with a reactive copolymerisable monomer containing a chromophore.

According to the invention, a coloured polymer latex is used which has been prepared from a hydrophobic monomer. Any hydrophobic monomer which is capable of undergoing an emulsion or suspension polymerisation can be used. Typical examples thereof are styrene, alkylstyrenes with one to four carbon atoms in the alkyl group such as vinyltoluene or butylstyrene, divinylbenzene, monohalogenated styrene such as monochloro- and monobromostyrene, acrylates, methacrylates, and vinylesters such as vinylacetate ethylene and vinylchloride. Minor amounts of other monomers may also be included.

The hydrophobic monomer is copolymerised with a chromophore which contains a reactive copolymerisable group. Typical examples of such reactive groups are vinyl and isopropenyl groups, and other molecules containing olefinic links.

Mixtures of different chromophores may also be used.

The coloured polymer latices are generally prepared by emulsion or suspension copolymerisation, with the aid of a polymerisation initiator, either in the presence or in the absence of a surfactant (see e.g. Bull.Soc.-Chim.Fr [1975][7-8 Pt.2] pages 1646-1648). It is also possible to prepare them by the direct emulsification or nonaqeuous dispersion polymerisation route, but this method is less preferred.

The final result is a uniformly coloured aqueous dispersion of polymer particles. As polymerisation initiator, a persulphate, or a peroxide, or azo initiators can be used. Of these, the azo initiators are preferred, because they allow higher polymer conversion degrees, and less oxidative colour loss.

Typically, an aminogroup-containing dye is reacted with acryloyl chloride to obtain a vinylgroup-containing chromophore monomer, which is then copolymerized in the usual way with the hydrophobic monomer, whereby the chromophore is chemically linked to the polymer backbone. If more than one vinyl group is introduced, crosslinking can occur. Other examples of coloured monomers are described in GB-A-1,533,044, GB-A-1,524,510, GB-A-1,269,627, GB-A-1,200,216, GB-A-879,071, GB-A-877,402, GB-A-875,946, GB-A-858,183, GB-A-830,876 and U.S. Pat. No. 4,044,029.

By selecting the appropriate chromophore monomer, latices with different colours are obtained, such as pink, purple, yellow, green, blue etc.

The coloured polymers of the present invention are suitable for colouring aqueous bleaching compositions, both thickened and non-thickened ones. These compositions may contain other ingredients, which are governed by the purpose for which these compositions are used, such as heavy duty fabric liquid bleaching and washing compositions, liquid fabric softening compositions, hair bleaching compositions, hygienic cleaning compositions, hard surface cleaning compositions, etc. Ingredients commonly encountered in such products may be included in the compositions of the invention.

The coloured polymers of the present invention are paricularly suitable for thickened aqueous alkali hypochlorite compositions such as described in GB-A-1 329 086, EP-A1-00 30401, GB-A-1 548 379, GB-A-1 466 560, GB-A1-2 003 522, GB-A1-2 051 162, GB-A1-2 076 010 and GB-A1-2 046 321.

The amount of coloured polymer used in the bleach composition varies from 0.0005 to 10% by weight, preferably from 0.001 to 1% by weight.

The invention will now further be illustrated by way of example.

EXAMPLE 1

Synthesis of chromophore monomer

A suitable chromophore was synthetized by condensing an amino-anthraquinone with acryloyl chloride as follows:

1,4-diaminoanthraquinone (97% pure) was dissolved in dry dimethylformamide and excess triethylamine added. The solution was cooled to 5° C. in an ice-bath and acryloyl chloride added dropwise over a period of 30 minutes, the temperature being maintained at 5° C. The solution was stirred for a further hour at 5° C., and then at room temperature for 1 hour.

The reaction mixture was then re-cooled to 5° C. to crystallize the amine hydrochloride, which was then removed by filtration. The chromophore monomer formed in this reaction was then precipitated into cold propane-2-ol, isolated by filtration, and then dried.

Preparation of Polymer Latices

(1) Emulsion Polymerisation (azo initiator)

1.9 g of the above chromophore monomer was dissolved in 17.1 g styrene. The mixture was then emulsified in 220 g of aqueous solution containing 1.7 g sodium dodecyl sulphate as emulsifier and previously warmed to 85° C. 0.5 g of 4,4'-azobisisobutyramidinium chloride dissolved in 30 g of cooled water was added to begin the polymerisation reaction. The temperature was maintained at 85° C. for 10 hours. Any unreacted styrene was removed by steam distillation, and the latex was used to produce a stable, transparent, coloured bleach.

(2) Surfactant-Free Polymerisation (persulphate initiator 1.0 g of the above chromophore monomer was dissolved in 9.0 g styrene and the resulting mixture added, with stirring to 970 g of water previously warmed to 85° C. 0.5 g of potassium persulphate dissolved in 30 g of cold water was then added to the reaction vessel. The temperature was maintained at 85° C., and the reaction allowed to proceed for approximately 8 hours. A coloured latex was produced. Any unreacted styrene was removed by steam distillation, and the latex could be used to colour a bleach-containing product.

(3) Surfactant-Free Polymerisation (azo initiator)

The above process 2 was repeated but with 4,4'-azobisisobutyramidinium chloride (0.5 g) as initiator instead of the persulphate. The polymerisation temperature was 85° C.

All the above coloured latices obtained had a pinky purple tinge.

EXAMPLE 2

A thickened bleach composition was formulated as follows:

| | % by weight |
|---|---|
| Sodium hypochlorite | 8.7 |
| Lauryl dimethyl amine oxide | 0.84 |
| Lauric acid | 0.29 |
| Sodium hydroxide | 1.00 |
| Sodium silicate (100° TW) | 1.07 |
| Perfume | 0.06 |
| Coloured latex | as specified below |
| Water | to 100 |

| Latex N° | % Latex (as 100% polymer | Colour Stability | Physical Stability |
|---|---|---|---|
| 1 | 0.05 | Colour retained for 1 month at 37° C. | Stable for 6 months at ambient temperatures |
| 2 | 0.005 | Colour retained for 6 months at ambient temperature | Stable for 6 months at ambient temperatures |
| 3 | 0.04 | Colour retained for 1 month at 37° C. | Stable for 6 months at ambient temperatures |

EXAMPLE 3

The same results were obtained with the following thickened bleach composition using Latex 3 of Example 1.

The composition of bleach was:

| | % by weight |
|---|---|
| Sodium hypochlorite | 7.0 |
| Lauryl dimethyl amine oxide | 1.5 |
| Lauric acid | 0.5 |
| Sodium hydroxide | 1.0 |
| Sodium silicate (100° TW) | 1.07 |
| Perfume | 0.06 |
| Latex | 0.04 |

EXAMPLE 4

The following chromophore monomers B, C, D, E, F, G, H, I, K and L were prepared as specified below:

Chromophore Monomer B

| | |
|---|---|
| 1,(2-hydroxyethyl)amino,4-methylamino anthraquinone (Disperse Blue 3; C.I. N° 61505) | 20 g |
| Dimethylformamide | 240 g |
| Triethylamine | 20 g |
| Acryloyl Chloride | 6.3 g |

Method: As in Example 1.

Chromophore Monomer C

| | |
|---|---|
| 4,N—acetyl,2'-hydroxy,5-methylazobenzene (Disperse Yellow 3; C.I. N° 11855) | 20 g |
| Dimethylformamide | 113 g |
| Triethylamine | 20 g |
| Acryloyl Chloride | 6.9 g |

Method: As in Example 1.

Chromophore Monomer D

| | |
|---|---|
| 1,4-hydroxyethylaminoanthraquinone (Disperse Blue 23; C.I. N° 61545) | 13.2 g |
| Dimethylformamide | 240 g |
| Triethylamine | 17 g |
| Acryloyl Chloride | 7.6 g |

Method: As in Example 1.

Chromophore Monomer E

| | |
|---|---|
| Reactive Blue 19 (C.I. N° 61200) | 10 g |
| Distilled Water | 30 g |

Method: The chromophore was dissolved in water and NaOH (2M solution) added until the pH=11. Potassium acetate (67% w/w) aqueous solution was added to precipitate the vinyl sulphone product, which was isolated by filtration, washed with ethanol and dried.

Chromophore Monomer F

| | |
|---|---|
| Disperse Yellow 1 (C.I. N° 10345) | 40 g |
| Dimethylformamide | 200 ml |
| Triethylamine | 30 g |
| Acryloyl Chloride | 13.4 g |

Method: As in Example 1.

Chromophore Monomer G

| | |
|---|---|
| Direct Yellow 59 (C.I. N° 49000) | 15 g |
| Dimethylformamide | 200 ml |
| Triethylamine | 7 g |
| Acryloyl Chloride | 3.2 g |

Method: The chromophore was converted to its acid form by treatment with 10% HCl, and the monomer was prepared as in Example 1.

Chromophore Monomer H

| | |
|---|---|
| Azoic Coupling Component 2 (C.I. N° 37505) | 50 g |
| Dimethylformamide | 300 ml |
| Triethylamine | 40.3 g |
| Acryloyl Chloride | 18 g |

Method: As in Example 1.

Chromophore Monomer I

| | |
|---|---|
| Mordant Yellow 1 (C.I. N° 14025) | 20 g |
| Dimethylformamide | 150 ml |
| Triethylamine | 15 g |
| Acryloyl Chloride | 6.7 g |

Method: As for chromophore monomer G.

Chromophore Monomer K

| | |
|---|---|
| Disperse Blue 26 (C.I. N° 63305) | 20 g |
| Dimethylformamide | 150 ml |
| Triethylamine | 27.7 g |
| Acryloyl Chloride | 12.4 g |

Method: As in Example 1.

Chromophore Monomer L

| | |
|---|---|
| Disperse Blue 3 (C.I. N° 61505) | 15 g |
| Dimethylformamide | 185 ml |
| Triethylamine | 10.8 g |
| Methacryloyl Chloride | 5.6 g |

Method: As in Example 1, substituting methacryloyl chloride for acryloyl chloride.

From these chromophore monomers, polymer latices were prepared as specified hereunder:

| Latex 4 Emulsion Polymerisation (azo initiator) | |
|---|---|
| Chromophore Monomer B | 1.9 g |
| Styrene | 17.1 g |
| Sodium Dodecyl Sulphate | 1.7 g |
| Distilled Water | 250.0 g |
| 4,4'-azobisisobutyramidinium Chloride | 0.5 g |

Method: As for Latex 1.

| Latex 5 Emulsion Polymerisation (azo initiator) | |
|---|---|
| Chromophore Monomer C | 0.2 g |
| Styrene | 19.8 g |
| Sodium Dodecyl Sulphate | 1.7 g |
| Distilled Water | 250.0 g |
| 4,4'-azobisisobutyramidinium Chloride | 0.5 g |

-continued

| Latex 5 Emulsion Polymerisation (azo initiator) | |
|---|---|
| Dimethylformamide | 2.0 g |

Method: The chromophore monomer was dissolved in dimethylformamide and the resulting solution added to the styrene. Polymerisation was then effected as for Latex 1.

| Latex 6 Microemulsion Polymerisation | |
|---|---|
| Chromophore Monomer D | 0.6 g |
| Styrene | 7.0 g |
| 4,4'-azobisisobutyronitrile | 0.3 g |
| Sodium Dodecyl Sulphate | 13.1 g |
| Hexanol | 12.0 g |
| Distilled Water | 200.0 g |

Method: Hexanol was added to a rapidly stirred solution of sodium dodecyl sulphate in water. The chromophore monomer and 4,4'-azobisisobutyronitrile were dissolved in styrene and added to the surfactant solution. The resulting microemulsion was polymerised under nitrogen for 6 hours at 60° C. Any unpolymerised monomer was removed from the resulting latex by steam distillation and the latex was used to colour a bleach-containing compound.

| Latex 7 Surfactant-Free Polymerisation (azo initiator) | |
|---|---|
| Chromophore Monomer D | 0.5 g |
| Styrene | 9.0 g |
| 4,4'-azobis (cyanovaleric acid) | 0.5 g |
| Distilled Water | 1000.0 g |

Method: As for Latex 3.

| Latex 8 Emulsion Polymerisation (cross-linked particles) | |
|---|---|
| Chromophore Monomer B | 1.9 g |
| Divinylbenzene | 17.1 g |
| Sodium Dodecyl Sulphate | 1.7 g |
| 4,4'-azobisisobutramidine Hydrochloride | 0.5 g |
| Distilled Water | 250.0 g |

Method: As for Latex 1, polymerising at 85° C. for 24 hours.

| Latex 9 Surfactant-Free Polymerisation | |
|---|---|
| Chromophore Monomer D | 1.84 g |
| Styrene | 90.3 g |
| Potassium Persulphate | 2.0 g |
| Sodium Chloride | 1.17 g |
| Distilled Water | 708.0 g |

Method: As for Latex 2, polymerising at 85° C. for 20 hours.

| Latex 10 Emulsion Polymerisation | |
|---|---|
| Chromophore Monomer E | 0.95 g |
| Styrene | 8.6 g |
| 4,4'-azobisisobutramidine Hydrochloride | 0.25 g |
| Distilled Water | 125.0 g |
| Sodiumdodecylsulphate | 0.86 g |

Method: As for Latex 1, polymerising at 82° C. for 24 hours.

| Latex 11 Emulsion Polymerisation | |
|---|---|
| Chromophore Monomer F | 1.9 g |
| Styrene | 17.1 g |
| 4,4'-azobisisobutramidine Hydrochloride | 0.5 g |
| Distilled Water | 250.0 g |
| Sodium Dodecyl Sulphate | 0.86 g |

Method: As for Latex 1, polymerising at 82° C. for 24 hours.

| Latex 12 Emulsion Polymerisation | |
|---|---|
| Chromophore Monomer G | 1.9 g |
| Styrene | 17.1 g |
| 4,4'-azobisisobutramidine Hydrochloride | 0.5 g |
| Sodium Dodecyl Sulphate | 0.86 g |
| Distilled Water | 250.0 g |

Method: As for Latex 1, polymerising at 82° C. for 24 hours.

| Latex 13 Emulsion Polymerisation | |
|---|---|
| Chromophore Monomer H | 1.9 g |
| Styrene | 17.1 g |
| 4,4'-azobisisobutramidine Hydrochloride | 0.5 g |
| Distilled Water | 250.0 g |
| Sodium Dodecylsulphate | 0.86 g |

Method: As for Latex 1, polymerising at 82° C. for 24 hours.

| Latex 14 Emulsion Polymerisation | |
|---|---|
| Chromophore Monomer I | 1.9 g |
| Styrene | 17.1 g |
| 4,4'-azobisisobutramidine Hydrochloride | 0.5 g |
| Sodium Dodecyl Sulphate | 0.86 g |
| Distilled Water | 250.0 g |

Method: As for Latex 1, polymerising at 82° C. for 24 hours.

| Latex 15 Surfactant-Free Polymerisation | |
|---|---|
| Chromophore Monomer B | 0.1 g |
| Methyl Methacrylate | 11.0 g |
| 4,4-azobisisobutramidine Hydrochloride | 0.5 g |
| Distilled Water | 387.0 g |

Method: The polymerisation was performed as for Latex 3, substituting methyl methacrylate for styrene.

| Latex 16 Emulsion Polymerisation | |
|---|---|
| Chromophore Monomer K | 1.9 g |
| Styrene | 17.1 g |
| 4,4'-azobisisobutramidine Hydrochloride | 0.5 g |
| Sodium Dodecyl Sulphate | 0.86 g |
| Distilled Water | 250.0 g |

Method: As for Latex 1, polymerising at 82° C. for 24 hours.

| Latex 17 Emulsion Polymerisation | |
|---|---|
| Chromophore Monomer L | 1.9 g |
| Styrene | 17.1 g |
| 4,4'-azobisisobutramidine Hydrochloride | 0.5 g |
| Sodium Dodecyl Sulphate | 1.29 g |

-continued

| Latex 17 Emulsion Polymerisation | |
|---|---|
| Distilled Water | 250.0 g |

Method: As for Latex 1, polymerising at 82° C. for 24 hours.

The polymer latices were each tested as to their stability, and the following results were obtained:

| Latex N° | Amount used | Colour Stability (Colour retained for) |
|---|---|---|
| 4 | 1000 ppm | more than 1 month at 37° C. |
| 5 | 1000 ppm | more than 1 month at 37° C. |
| 6 | 1000 ppm | 4 days at 25° C. |
| 7 | 1000 ppm | more than 2 months at 37° C. |
| 8 | 1000 ppm | 15 days at 37° C. |
| 9 | 1000 ppm | more than 1 month at 25° C. |
| 10 | 1000 ppm | 1 day at room temperature |
| 11 | 1000 ppm | more than 10 days at 37° C. |
| 12 | 500 ppm | more than 20 days at 37° C. |
| 13 | 1000 ppm | more than 5 days at room temp. |
| 14 | 1000 ppm | more than 1 week at room temp. |
| 15 | 500 ppm | more than 5 days at room temp. |
| 16 | 1000 ppm | more than 1 month at room temp. |
| 17 | 1000 ppm | more than 1 month at 37° C. |

The physical stability of all these products was satisfactory.

EXAMPLE 5

500 ppm of latex N° 4 was used to colour the following compositions:

| | % by weight |
|---|---|
| (a) Sodium salt of sulphated $C_{12}$–$C_{15}$ linear primary alcohol, condensed with 3 moles of ethylene oxide | 3 |
| Hydrogen Peroxide | 8 |
| | pH = 7.26 (adjusted with 8% NaOH) |
| (b) $C_{13}$–$C_{15}$ linear primary alcohol condensed with 7 moles of ethylene oxide | 3 |
| Hydrogen Peroxide | 8 |
| | pH = 1.30 (adjusted with 35% HCl) |
| (c) Sodium salt of sulphated $C_{12}$–$C_{15}$ linear primary alcohol, condensed with 3 moles of ethylene oxide | 3 |
| Hydrogen Peroxide | 8 |
| Diethylenetriaminepentamethylene phosphonic acid | 1 |
| | pH = 9.25 (adjusted with 8% NaOH) |
| (d) $C_{13}$–$C_{15}$ linear primary alcohol condensed with 7 moles of ethylene oxide | 4.3 |
| Hydrogen Peroxide | 8 |
| | pH = 6.7 (adjusted with NaOH) |

The colour was retained in these formulations for more than 1 week at room temperature, and the physical stability was satisfactory. When formulations a, c and d were thickened by inclusion of 10, 10 and 7% NaCl, respectively, products were obtained with a viscosity of 50, 30 and 25 cS, respectively, and the colour and physical stability did not change.

We claim:

1. A coloured aqueous bleaching agent comprising an oxygen or chlorine bleaching agent and a colouring agent in an aqueous medium, wherein the composition comprises from 0.0005–10% by weight of a colouring agent which is a coloured polymer latex consisting of a copolymer of a hydrophobic olefinic monomer with a copolymerisable olefinic monomer containing a chromophore.

2. A composition according to claim 1, wherein the hydrophobic olefinic monomer is capable of undergoing an emulsion or suspension polymerisation.

3. A composition according to claim 2, wherein the hydrophobic olefinic monomer is styrene or $C_1$–$C_4$ alkylstyrene or a monohalogenated styrene, an acrylate or a methacrylate or a vinylester.

4. A composition according to claim 1, wherein the copolymerisable group of the chromophore is a vinyl or isopropenyl group.

5. A composition according to claim 1, wherein the coloured polymer latex is a copolymer of a copolymerisable derivative of an amino- or hydroxyl group-containing dye, with stryene.

6. A composition according to claim 1, wherein the composition contains an alkali metal hypochlorite.

7. A composition according to claim 6, wherein the composition is a thickened composition.

* * * * *